Feb. 13, 1962  B. B. OGIER ETAL  3,021,422
PHOTOGRAPHIC LIGHT UNIT
Filed Feb. 17, 1960  2 Sheets-Sheet 1

INVENTORS
BAXTER B. OGIER
LOUIS A. UMBACH
BY *Francis J. Klempay*
ATTORNEY

United States Patent Office 3,021,422
Patented Feb. 13, 1962

3,021,422
PHOTOGRAPHIC LIGHT UNIT
Baxter B. Ogier and Louis A. Umbach, Youngstown, Ohio, assignors to The Photogenic Machine Company, Youngstown, Ohio, a corporation of Ohio
Filed Feb. 17, 1960, Ser. No. 9,248
8 Claims. (Cl. 240—1.3)

The present invention relates generally to illuminating apparatus and more particularly to the provision of a photographic light unit specifically designed for but not limited to use in the graphic arts industry. It is well known in copy photography to place the material to be copied against a copy board and to illuminate the same while the photograph is being taken. Copy photography is particularly advantageous and has found wide use in the preparation of negatives from which printing plates are made. While various lamps and illuminating fixtures have been proposed in the prior art for such copy work, the same are characterized by their complexity and high cost of operation and maintenance.

It is the primary or ultimate object of the present invention to provide a photographic light unit which is ideally adapted for use in copy photography, for example, that is lightweight, compact, of relatively inexpensive construction and which may be operated and maintained at a low cost. While the photographic light unit disclosed herein is specifically designed for use in copy photography it should be understood from the outset that the teachings of the invention are not limited thereto and are equally applicable to other light units.

It is another object of this invention to provide a photographic light unit wherein the illuminating element or tube, as well as the protective glass therefor, may be removed and replaced individually in a minimum of time and with a minimum of effort by even the most unskilled operator without the use of special tools. In prior art apparatus the illuminating element or tube and the protective glass are embodied as a single unit and must be removed and replaced as such. Thus, if the tube burns out, not only the tube but also the protective glass must be replaced and this is, of course, relatively expensive. Also, in most cases, the job of replacing the tube and the protective glass is quite complicated and can only be accomplished at the factory which is expensive and results in loss of use of the light unit for a considerable period of time.

Yet another object of the present invention is to provide a photographic light unit having improved means for circulating cooling air about the illuminating element or tube. A xenon gas filled tube is employed as the light source which generates considerable heat and it is necessary to cool the same. In the present instance a fan or blower and suitable passageways are provided for the circulation of cooling air about the illuminating element or tube in an improved manner.

A further object of the invention is to provide a photographic light unit having improved means for releasably clamping and making electrical contact with the illuminating element or tube.

The above, as well as other objects and advantages, will become more apparent upon consideration of the following specification and accompanying drawing wherein there is disclosed a preferred embodiment of the invention.

Figure 1:
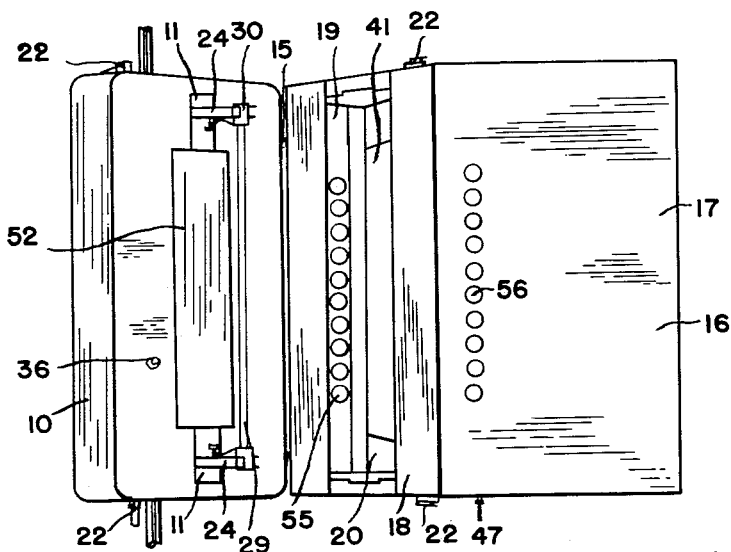
FIGURE 1 is a side perspective view of a photographic light unit constructed in accordance with the teachings of this invention.

Referring now to the drawing, the reference numeral 10 designates a generally rectangular fan housing which is formed from sheet metal or other suitable material and is provided wtih a pair of vertically spaced openings 11 in the forward face thereof through which project the tube clamping and contact assemblies to be hereinafter more fully described. The rear wall of the housing 10 also has an opening 12 therein and mounted on the back of the housing is a small electrically powered fan or blower 13 that is adapted to circulate cooling air through the lamp unit as will be later described. This fan or blower 13 may be mounted within the housing 10 if desired.

Figure 2:
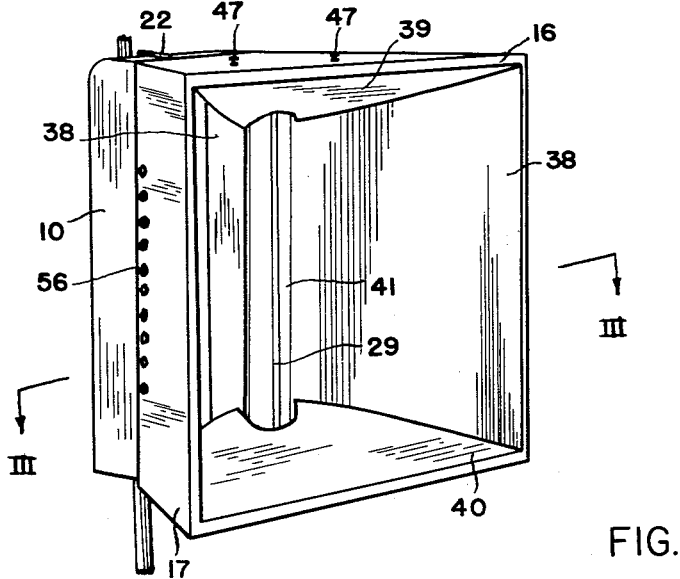
FIGURE 2 is a front perspective view of the light unit shown in FIGURE 1 with the fan housing and the reflector housing closed and latched with respect to each other.
Figure 3:
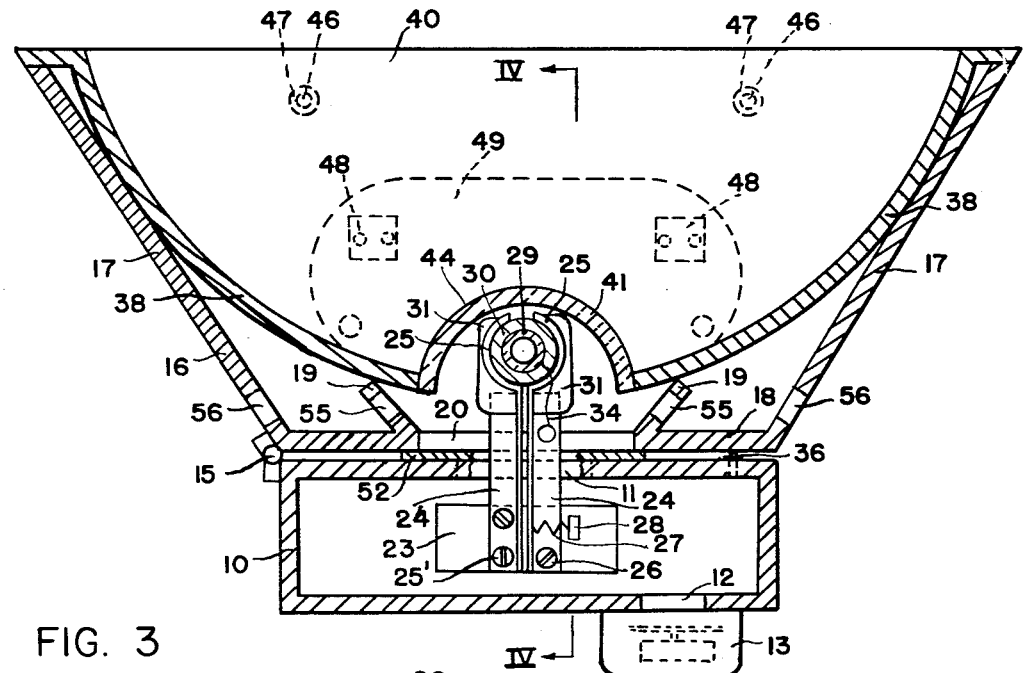
FIGURE 3 is a plan sectional view taken generally along the section line III—III of FIGURE 2.
Figure 4:
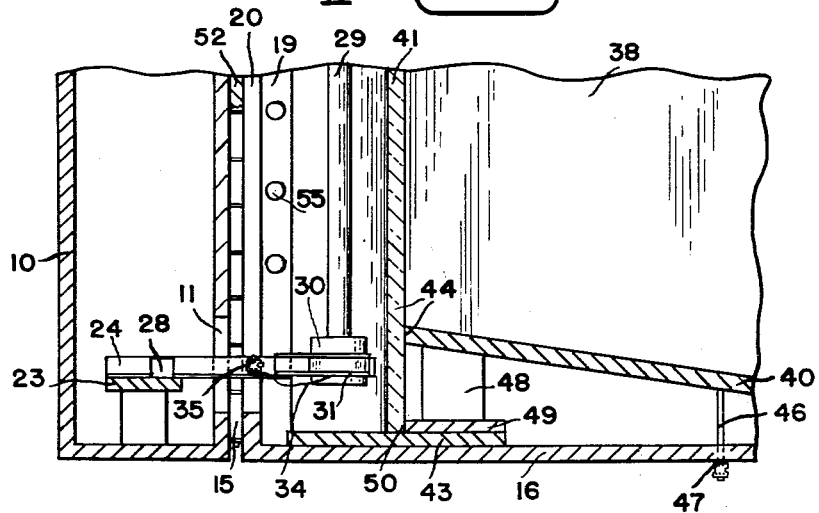
FIGURE 4 is a fragmentary side sectional view as seen from the section line IV—IV of FIGURE 3.

Pivotally attached by an elongated hinge 15 positioned at one forward corner of the housing 10 is a reflector housing 16 which, as will be noted in the various views of the drawing, is generally trapezoidal in plan outline. The reflector housing 16 comprises a pair of side members 17 that are each fabricated to provide an outwardly flaring side wall, and end wall 18 and an outwardly flaring and forwardly extending flange 19. The end walls 18 and flanges 19 of the side members 17 are laterally spaced from each other to define a vertically elongated center opening or slot 20 in the rear of the reflector housing 16. The reflector housing is also preferably formed from sheet metal and is adapted to have pivoted swinging movement with respect to the housing 10 about the hinge 15. During normal operation of the photographic light unit the housing 10 and the reflector housing are maintained in closed assembled relation as shown in FIGURES 2–4 of the drawing by means of suitable quick-release latches 22 mounted on adjacent portions of the housings opposite the hinge 15.

As mentioned previously, a tube clamping and contact assembly projects forwardly through each of the vertically spaced openings 11 in the forward face of the fan housing 10. Each of these assemblies comprises a suitable insulating block 23 received and mounted in the fan housing which carries a pair of forwardly projecting clamping members 24. The clamping members 24 are generally L-shaped in cross section throughout the greater portion of their lengths and terminate at their forward ends in semi-circular hook-like projections 25. One of the clamping members 24 is rigidly attached to the insulating block 23 by means of screws 25' while the other of these members is pivotally attached to the insulating block 23 by a screw 26 and is urged toward the rigidly attached clamping member by a compression spring 27. The compression spring 27 extends between the upstanding side wall of the pivoted clamping member 24 and a suitable abutment 28 on the insulating block 23. The arrangement is such that the hook-like projection 25 of the pivoted clamping member is forcibly urged toward the projection 25 of the rigidly attached clamping member. The illuminating element comprises an elongated gas filled tube 29 having end assemblies 30 at the opposite ends thereof which are adapted to be engaged and clamped between the hook-like projections 25 of the vertically spaced pairs of the clamping members 24.

Each of the clamping members 24 carries a channel-shaped member 31 adjacent the forward end thereof which is formed to nest with respect to the hook-like projection 25 and provides a pair of laterally projecting and vertically spaced heat radiating fins. As will be understood, the illuminating element or tube 29 generates considerable heat during the use thereof and the channel shaped members 31, along with the clamping members 24, serve as a means to conduct such heat away from the end assemblies 30 of the tube 29. It is contemplated that the clamping members 24 and heat radiating fins 31 will be fabricated from copper or other current and heat conductive material.

The tube 29 is provided with a lead 34 adjacent each end thereof which is electrically connected to one of the clamping members 24 of the clamping and contact assembly associated therewith by means of a terminal nut and bolt assembly 35. The tube 29 is not only firmly maintained in proper clamped relation by the clamping members 24 but also electrical contact with the tube is made through these members. While the complete electrical circuit for energization of the tube 29 is not shown in the drawing, it should be understood that suitable conductor means are provided for connecting those clamping members carrying the terminal assemblies 35 with output terminals of a power source, not shown. Such conductor means preferably comprises a button switch 36 mounted on the forward face of the fan housing 10 that is adapted to be depressed when the reflector housing 16 is closed and latched with respect to the fan housing. The button switch 36 provides a valuable safety feature in that energizing potential is not supplied to the tube when the reflector housing is pivoted to its open position as shown in FIGURE 1 of the drawing.

It will be observed that the forward ends of the pairs of clamping members 24 project through the vertically spaced openings 11 in the housing 10 whereby the tube is clamped forwardly of the housing and, along with the pairs of clamping members and terminal assemblies 35, is completely exposed with respect to the housing. The arrangement is such that the tube 29 may be easily removed, replaced, inspected, etc. when the reflector housing is pivoted away from the housing 10 without dismantling of any part of the photographic lamp unit.

The reflector housing 16 mounts a pair of side reflector members 38 and top and bottom reflector members 39 and 40, respectively. The reflector members each have a specular and light reflecting surface whereby the same provide contoured reflecting surfaces for the tube 29. Each of the side reflector members 38 is curved and when these members are assembled, as shown in FIGURE 3 of the drawing, they define a generally parabolic reflecting surface. Received between and spanning the laterally spaced and adjacent end portions of the side reflector members 38 is a vertically extending semi-cylindrical piece of transparent protective glass 41. The protective glass 41 is disposed in aligned relation with respect to and forwardly of the vertical slot 20 in the rear wall of the reflector housing and the openings 11 in the fan housing. The arrangement is such that when the reflector housing and the fan housing are closed, the tube 29 held by the pairs of clamping members 34 projects forwardly into the interior of the reflector housing and is nestingly received within the center opening of the semi-cylindrical protective glass 41.

The protective glass 41 extends between the top and bottom reflector members and each end thereof rests on a pad 43 of asbestos or other heat insulating material which is generally elliptical in shape and is secured by any convenient attachment means to the reflector housing. Each of the top and bottom reflector members 39 and 40 is generally semi-circular and is formed with a semi-circular notch 44 at the center of the rear edge thereof that is adapted to nestingly receive the protective glass 41. Each of these reflector members is tilted and flares outwardly toward the forward edge of the reflector housing and is secured thereto by means of a pair of vertically extending rods 46 whose threaded ends project through suitable apertures in the reflector housing and are adapted to receive the locking nuts 47. The top and bottom reflector members 39 and 40 can be taken from the reflector housing when the locking nuts 47 are removed from the rods 46.

Attached to the rear end of each of the top and bottom reflector members are a pair of laterally spaced and vertically extending stand-off elements 48 which in turn mount a heat insulating pad 49. The insulating pads 49 are the same elliptical shape as the insulating pads 43 with the exception that these members are formed with semi-cylindrical notches 50 that are adapted to receive and nest with respect to the protective glass 41. Each end of the protective glass 41 rests on one of the insulating pads 43 and is maintained in assembled relation by one of the insulating pads 49 carried by the removable top or bottom reflector members. This arrangement is depicted in FIGURE 4 of the drawing and it will be noted that the adjacent pads 43 and 49 are disposed in flat overlying relation.

The protective glass is very firmly maintained in assembled relation by the top and bottom reflector members 39 and 40 but yet these reflector members are easily removed upon loosening of the locking nuts 47 to allow removal and replacement of the protective glass. The reflector members 38–40 define a reflector of the desired shape and contour which is adapted to properly reflect the light rays emitted by the tube 29 when the same is nestingly received within the protective glass 41. To complete the reflecting surface for the light unit a piece of reflecting material 52 is attached to the forward face of the housing 10 intermediate the vertically spaced pairs of clamping members 34.

As indicated above, a blower or fan 13 is carried by the housing 10 and is adapted to circulate air about the tube 29 to cool the same. The air travels through the vertically spaced openings 11 in the forward face of the housing 10 and then vertically about the tube 29. As will be noted in FIGURE 3 of the drawings, the protective glass 41, the flanges 19, the piece of reflecting material 52 and the forward face of the housing 10 define an enclosed area when this housing and the reflector housing are closed and latched to each other. To allow for the escape of the air after the same has circulated about the tube 29, there are provided a series of vertically spaced apertures 55 in each of the flanges 19. A second series of vertically spaced apertures 56 is formed at the rear end of each of the outwardly flaring side walls of the side members 17 in the reflector housing. The apertures 55 and 56 are positioned vertically intermediate openings 11 in the fan housing and the pairs of clamping members 34 whereby cooling air is forced to flow vertically about the tube 29 before being exhausted through the apertures 55 and 56 to atmosphere. The provision of the heat radiating fins 31 and the above described means for circulating cooling air about the tube 29 insures that the same will be properly cooled at all times.

In the use of the light unit above described, the reflector housing is normally closed and latched to the housing 10. If the tube 29 burns out, is broken or for any other reason needs removed or replaced, the latches 22 are disengaged and the reflector housing is pivoted away from the housing 10. This completely exposes the tube 29 and the clamping members 34 along with the terminal assemblies 35. To remove the tube 29 it is only necessary to loosen the terminal bolts of the terminal assemblies 35 whereby the lead wires 34 may be removed and then to separate the hook-like projections 25 of the clamping members 24. The tube 29 is removed and a new tube is inserted in its place. It will be noted that this operation is characterized by its upmost simplicity and is accomplished in a minimum of time without the use of special tools or skills.

When it is desired to remove or replace the protective glass 41, the locking nuts 47 are removed and the top and bottom reflector members 39 and 40 are taken from the reflector housing. Then the protective glass 41 can be withdrawn forwardly through the front of the reflector housing and a new protective glass inserted. The removal and replacement of the protective glass 41 is also characterized by its extreme simplicity and is adapted to be performed by even the most unskilled operator.

Another advantage of the photographic light unit described above is that both the protective glass 41 and the tube 29 are immediately exposed for inspection, cleaning and maintenance when the reflector housing is pivoted from the housing 10. In prior art apparatus, the tube and the protective glass are usually employed as an integral single unit and replacement units are relatively expensive even though it is very seldom that both of these elements need replacing simultaneously.

While we have shown and disclosed an illustrated embodiment constructed in accordance with the teachings of this invention, it should be understood that many changes may be made therein without departing from the true scope and intent of the invention. Accordingly, reference should be had to the following appended claims in determining the scope of the invention.

We claim:

1. A light unit comprising a rear housing, said rear housing having a front wall, a pair of vertically spaced openings in said front wall, a clamping and contact assembly extending forwardly through each of said openings, an elongated illuminating element mounted by said clamping and contact assemblies forwardly of said front wall and generally parallel therewith, a front housing having a rear wall, an elongated vertical slot in said rear wall, a generally semi-cylindrical light-transmitting protective member, means mounting said protective member in said front housing forwardly of said rear wall, and means releasably securing said front housing to said rear housing with said rear wall adjacent said front wall whereby said illuminating element is nestingly received within said protective member.

2. Apparatus according to claim 1 further characterized in that said means releasably securing comprises hinge means interconnecting adjacent edges of said front and rear housings, and quick-release latch means mounted on other adjacent portions of said front and rear housings.

3. Apparatus according to claim 2 further characterized in that each of said clamping and contact assemblies comprises a pair of clamping members whose forward ends terminate in opposed hook-like projections, means urging one of said clamping members toward the other thereof, and laterally projecting heat radiating fins carried by each of said clamping members adjacent said projections.

4. A light unit comprising a rear housing, a front housing, said rear housing having a front wall, an elongated illuminating element, means mounting said illuminating element from said rear housing forwardly of said front wall thereof in exposed relation therewith and generally parallel thereto, said front housing having a rear wall, said rear wall having an opening therein through which said illuminating element projects, a light-transmitting protective member carried by said front housing and disposed forwardly of said opening, said protective member nestingly receiving said illuminating element, and means releasably securing said front housing and said rear housing to each other with said front wall adjacent said rear wall to allow removal of said front housing with respect to said rear housing to expose said illuminating element; and means to cool said illuminating element, said means to cool comprising a fan mounted by said rear housing, an opening in said front wall of said rear housing, a plurality of apertures in said front housing communicating with the interior of said protective member, and said openings and said apertures defining passageway for the circulation of cooling air by said fan.

5. A light unit comprising an elongated illuminating element, a wall having a pair of spaced openings therein, clamping and terminal assemblies extending through said openings and mounting said illuminating element, a generally semi-cylindrical elongated light-transmitting protective element, said protective element nestingly receiving said illuminating element, flange means extending generally between said wall and the edges of said protective member, apertures in said flange means, and means to force cooling air through said openings, about said illuminating element and out through said apertures, said apertures in said flange means being disposed intermediate said openings whereby said cooling air is forced to flow along said illuminating element.

6. A light projector comprising a box-like rear housing having a front wall and mounting a pair of spaced current-conductive members projecting forwardly of said wall which are operative to mount an elongated light emitting element forwardly of said wall and generally parallel therewith, said front wall having air-emitting openings surrounding said members, means to establish a pressure head of air within said housing, a front housing having a rear wall overlying said front wall and having forwardly extending side, top and bottom walls, said front housing being hinged to said rear housing along a forward edge of the latter, a semi-cylindrical light-transmitting shield carried by said front housing and adapted to fit about said element when said front housing is closed against said rear housing, said rear wall having openings communicating with the openings in said front wall of the rear housing to allow air to be conducted into said shield and about said element, the rear edges of said shield being spaced forwardly of said rear wall to allow for the egress of heated air from said shield and thus from the space surrounding said element, the arrangement being such that upon said front housing being swung away from said rear housing said element is instantly accessible for cleaning and/or replacement while both surfaces of said shield are exposed for cleaning.

7. Apparatus according to claim 6 further including parabolic reflector members within said front housing and extending outwardly and forwardly of each longitudinal side edge of said semi-cylindrical shield.

8. Apparatus according to claim 7 further including flanges extending forwardly of the rear wall of said front housing and engaging the rear surfaces of said reflector sections to define with said shield a box-like enclosure about said element, said flanges having air-emitting apertures space longitudinally along said element with respect to the air-emitting openings in said front wall of said rear housing, ventilating apertures in said front housing to receive air emitted through said apertures in said flanges, the arrangement being such that cooling air is caused to circulate longitudinally along said element.

References Cited in the file of this patent

UNITED STATES PATENTS

| | | |
|---|---|---|
| 1,918,347 | Mitchell | July 18, 1933 |
| 2,295,863 | Paradis | Sept. 15, 1942 |
| 2,318,311 | Hicks | May 4, 1943 |
| 2,348,617 | Furedy | May 9, 1944 |
| 2,413,599 | Beck | Dec. 31, 1946 |
| 2,804,537 | Greger | Aug. 27, 1957 |